(12) United States Patent
McGinnis et al.

(10) Patent No.: US 9,248,405 B2
(45) Date of Patent: Feb. 2, 2016

(54) FORWARD OSMOSIS SEPARATION PROCESSES

(75) Inventors: Robert L. McGinnis, Coventry, CT (US); Joseph Edward Zuback, Camarillo, CA (US)

(73) Assignee: Oasys Water, Inc., Boston, MA (US)

( * ) Notice: Subject to any disclaimer, the term of this patent is extended or adjusted under 35 U.S.C. 154(b) by 742 days.

(21) Appl. No.: 13/504,044

(22) PCT Filed: Oct. 28, 2010

(86) PCT No.: PCT/US2010/054512
§ 371 (c)(1),
(2), (4) Date: Jul. 11, 2012

(87) PCT Pub. No.: WO2011/059751
PCT Pub. Date: May 19, 2011

(65) Prior Publication Data
US 2012/0273417 A1     Nov. 1, 2012

Related U.S. Application Data

(60) Provisional application No. 61/255,734, filed on Oct. 28, 2009.

(51) Int. Cl.
*C02F 1/44* (2006.01)
*B01D 61/00* (2006.01)
(Continued)

(52) U.S. Cl.
CPC ............. *B01D 61/002* (2013.01); *B01D 61/36* (2013.01); *B01D 61/364* (2013.01); *B01D 2311/08* (2013.01); *B01D 2311/13* (2013.01);
(Continued)

(58) Field of Classification Search
CPC ............... B01D 61/002; B01D 61/005; B01D 2317/02; B01D 2311/04; B01D 2311/12; B01D 2311/246; C02F 1/445
USPC .......... 210/642, 639, 649, 650, 651, 739, 744
See application file for complete search history.

(56) References Cited

U.S. PATENT DOCUMENTS 3,130,156 A     4/1964  Neff
3,171,799 A     3/1965  Batchelder
(Continued)

FOREIGN PATENT DOCUMENTS

CN     1853044 A     10/2006
CN     101636354 A     1/2010
(Continued)

OTHER PUBLICATIONS

Cath et al. Membrane contactor processes for wastewater reclamation in space. Part I. Direct osmotic concentration as pretreatment for reverse osmosis. Journal of Membrane Science 257 (2005) 85-98.*
(Continued)

*Primary Examiner* — Katherine Zalasky
(74) *Attorney, Agent, or Firm* — Lando & Anastasi, LLP

(57) ABSTRACT

Separation processes using engineered osmosis are disclosed generally involving the extraction of solvent from a first solution to concentrate solute by using a second concentrated solution to draw the solvent from the first solution across a semi-permeable membrane. Enhanced efficiency may result from using low grade waste heat from industrial or commercial sources.

8 Claims, 3 Drawing Sheets

(51) Int. Cl.
  *B01D 3/42* (2006.01)
  *B01D 5/00* (2006.01)
  *B01D 61/36* (2006.01)

(52) U.S. Cl.
  CPC ............... *C02F 1/445* (2013.01); *Y02W 10/33* (2015.05); *Y02W 10/37* (2015.05)

(56) References Cited

U.S. PATENT DOCUMENTS

| | | | |
|---|---|---|---|
| 3,216,930 A | 11/1965 | Glew | |
| 3,357,917 A | 12/1967 | Humphreys | |
| 3,405,058 A | 10/1968 | Miller | |
| 3,470,093 A | 9/1969 | Johanson | |
| 3,532,621 A | 10/1970 | Hough | |
| 3,541,006 A | 11/1970 | Bixler | |
| 3,562,116 A | 2/1971 | Rodgers | |
| 3,562,152 A | 2/1971 | Davison | |
| 3,617,547 A | 11/1971 | Halff et al. | |
| 3,649,467 A | 3/1972 | Winsel et al. | |
| 3,670,897 A | 6/1972 | Frank | |
| 3,707,231 A | 12/1972 | Bradley | |
| 3,721,621 A | 3/1973 | Hough | |
| 4,023,946 A | 5/1977 | Schwartzman | |
| 4,083,781 A | 4/1978 | Conger | |
| 4,111,759 A | 9/1978 | Didycz et al. | |
| 4,142,966 A | 3/1979 | Perry | |
| 4,152,901 A | 5/1979 | Munters | |
| 4,207,183 A | 6/1980 | Herrigel | |
| 4,216,820 A | 8/1980 | Andrew | |
| 4,316,774 A | 2/1982 | Trusch | |
| 4,334,992 A | 6/1982 | von Bonin et al. | |
| 4,350,571 A | 9/1982 | Erickson | |
| 4,357,153 A | 11/1982 | Erickson | |
| 4,476,024 A | 10/1984 | Cheng | |
| 4,525,244 A | 6/1985 | Gourlia et al. | |
| 4,539,076 A | 9/1985 | Swain | |
| 4,545,862 A | 10/1985 | Gore et al. | |
| 4,585,523 A | 4/1986 | Giddings | |
| 4,618,429 A | 10/1986 | Herrigel | |
| 4,689,156 A | 8/1987 | Zibrida | |
| 4,718,986 A | 1/1988 | Comiotto et al. | |
| 4,767,544 A | 8/1988 | Hamblin | |
| 4,781,837 A | 11/1988 | Lefebvre | |
| 4,808,287 A | 2/1989 | Hark | |
| 4,962,270 A | 10/1990 | Feimer et al. | |
| 5,000,925 A | 3/1991 | Krishnamurthy et al. | |
| 5,098,575 A | 3/1992 | Yaeli | |
| 5,124,004 A | 6/1992 | Grethlein et al. | |
| 5,127,234 A | 7/1992 | Woods, Jr. | |
| 5,281,430 A | 1/1994 | Herron et al. | |
| 5,300,197 A | 4/1994 | Mitani et al. | |
| 5,382,365 A | 1/1995 | Deblay | |
| 5,403,490 A | 4/1995 | Desai | |
| 5,501,798 A | 3/1996 | Al-Samadi et al. | |
| 5,614,065 A | 3/1997 | Marker | |
| 5,830,314 A | 11/1998 | Mattsson | |
| 5,905,182 A | 5/1999 | Streicher et al. | |
| 5,932,074 A | 8/1999 | Hoiss | |
| 5,997,594 A | 12/1999 | Edlund et al. | |
| 6,273,937 B1 | 8/2001 | Schucker | |
| 6,375,848 B1 | 4/2002 | Cote et al. | |
| 6,391,205 B1 | 5/2002 | McGinnis | |
| 6,551,466 B1 | 4/2003 | Kresnyak et al. | |
| 6,589,395 B1 | 7/2003 | Meili | |
| 6,716,355 B1 | 4/2004 | Hanemaaijer et al. | |
| 6,811,905 B1 | 11/2004 | Cropley et al. | |
| 6,849,184 B1 | 2/2005 | Lampi et al. | |
| 6,998,053 B2 | 2/2006 | Awerbuch | |
| 7,025,885 B2 | 4/2006 | Cote et al. | |
| 7,560,029 B2 | 7/2009 | Mc Ginnis | |
| 7,608,188 B2 | 10/2009 | Cath et al. | |
| 7,641,717 B2 | 1/2010 | Gal | |
| 7,666,251 B2 | 2/2010 | Shah et al. | |
| 7,699,961 B2 | 4/2010 | Ikeda et al. | |
| 7,727,400 B2 | 6/2010 | Flynn | |
| 7,771,569 B2 | 8/2010 | Yang et al. | |
| 7,799,178 B2 | 9/2010 | Eddington | |
| 7,827,820 B2 | 11/2010 | Weimer et al. | |
| 7,867,365 B2 | 1/2011 | Brown | |
| 7,879,243 B2 | 2/2011 | Al-Mayahi et al. | |
| 7,914,680 B2 | 3/2011 | Cath et al. | |
| 7,981,256 B2 | 7/2011 | Wegerer et al. | |
| 8,021,549 B2 | 9/2011 | Kirts | |
| 8,021,553 B2 | 9/2011 | Iyer | |
| 8,029,671 B2 | 10/2011 | Cath et al. | |
| 8,029,675 B2 | 10/2011 | Heinzl | |
| 8,512,567 B2 | 8/2013 | Shapiro | |
| 2004/0211725 A1 | 10/2004 | Jansen et al. | |
| 2005/0145568 A1 | 7/2005 | Mc Ginnis | |
| 2005/0183440 A1 | 8/2005 | Holtzapple et al. | |
| 2006/0011544 A1 | 1/2006 | Sharma et al. | |
| 2006/0144789 A1 | 7/2006 | Cath et al. | |
| 2006/0150665 A1 | 7/2006 | Weimer et al. | |
| 2007/0068871 A1 | 3/2007 | Flynn | |
| 2007/0246426 A1* | 10/2007 | Collins .................... 210/651 |
| 2007/0278153 A1 | 12/2007 | Oriard et al. | |
| 2008/0210634 A1 | 9/2008 | Thorsen et al. | |
| 2008/0307968 A1* | 12/2008 | Kang et al. .................... 95/199 |
| 2009/0134004 A1 | 5/2009 | Asprey | |
| 2009/0297431 A1 | 12/2009 | McGinnis et al. | |
| 2009/0308727 A1 | 12/2009 | Kirts | |
| 2010/0108587 A1 | 5/2010 | McGinnis | |
| 2010/0155329 A1 | 6/2010 | Iyer | |
| 2010/0155333 A1 | 6/2010 | Husain et al. | |
| 2010/0163471 A1 | 7/2010 | Elyanow et al. | |
| 2010/0192575 A1 | 8/2010 | Al-Mayahi et al. | |
| 2011/0084025 A1 | 4/2011 | Tominaga et al. | |
| 2011/0132840 A1 | 6/2011 | Choi et al. | |
| 2011/0155665 A1 | 6/2011 | Cohen et al. | |
| 2012/0048803 A1 | 3/2012 | Shapiro | |
| 2013/0001162 A1 | 1/2013 | Yangali-Quintanilla et al. | |
| 2013/0056416 A1 | 3/2013 | Chen | |

FOREIGN PATENT DOCUMENTS

| | | |
|---|---|---|
| CN | 101734737 A | 6/2010 |
| CN | 101797479 A | 8/2010 |
| EP | 0121099 A2 | 10/1984 |
| FR | 2102763 A5 | 4/1972 |
| GB | 1526836 A | 10/1978 |
| GB | 2442941 A | 4/2008 |
| GB | 2464956 A | 5/2010 |
| JP | 53-032885 A | 3/1978 |
| JP | 57-012802 A | 1/1982 |
| JP | 06-063362 A | 3/1994 |
| JP | 2008-100219 A | 5/2008 |
| KR | 10-0697563 B1 | 3/2007 |
| KR | 2009-0029232 A | 3/2009 |
| WO | 9323150 A1 | 11/1993 |
| WO | 9535153 A2 | 12/1995 |
| WO | 9939799 A1 | 8/1999 |
| WO | 9964147 A2 | 12/1999 |
| WO | 0105707 A1 | 1/2001 |
| WO | 02060825 A2 | 8/2002 |
| WO | 2007146094 A2 | 12/2007 |
| WO | 2007147013 A1 | 12/2007 |
| WO | 2008059219 A1 | 5/2008 |
| WO | 2008060435 A2 | 5/2008 |
| WO | 2009155596 A2 | 12/2009 |
| WO | 2010017991 A2 | 2/2010 |
| WO | 2010127819 A1 | 11/2010 |
| WO | 2011004303 A1 | 1/2011 |
| WO | 2011053794 A2 | 5/2011 |
| WO | 2014124443 A1 | 8/2014 |

OTHER PUBLICATIONS

Tan, Sally. Forward osmosis: Basic principles, big impact. Yale Scientific Magazine (Spring 2007), 4 pages.*
Eastern Municipal Water District Carollo Engineers. Evaluation and selection of available processes for a zero-liquid discharge system for the Perris, California ground water basin. U.S. Department of the Interior (Apr. 2008), 198 pages.*

(56) References Cited

OTHER PUBLICATIONS

Achilli et al. "Pressure Retarded Osmosis: From the Vision of Sidney Loeb to the First Prototype Installation—Review". Desalination 261 (2010) pp. 205-211.

Achilli et al. "The Forward Osmosis Membrane Bioreactor: A Low Fouling Alternative to MBR Processes". Desalination 239 (2009) 10-21.

Bamaga et al. "Application of Forward Osmosis in Pretreatment of Seawater for Small Reverse Osmosis Desalination Units". Desalination and Water Treatment, vol. 5 (May 2009) 183-191.

Bamaga et al. "Hybrid FO/RO Desalination System: Preliminary Assesment of Osmotic Energy Recovery and Designs of New FO Membrane Module Configurations". Desalination 268 (2011) pp. 163-169.

Cath et al. "Forward Osmosis: Principles, Applications, and Recent Developments". Journal of Membrane Science 281:70-97 (2006).

Choi et al. "Toward a Combined System of Forward Osmosis and Reverse Osmosis for Seawater Desalination". Desalination 247 (2009) 239-246.

Chung et al. "Forward Osmosis Processes: Yesterday, Today, and Tomorrow". Desalination. 2011.

Gerstandt et al. "Membrane Processes in Energy Supply for an Osmotic Power Plant". Desalination 224 (2008) pp. 64-70.

Ghiu et al. "Permeability of Electrolytes Through a Flat RO Membrane in a Direct Osmosis Study". Desalination 144 (2002) 387-392.

Glueckauf et al. "Sea Water Softening by Osmosis Through Desalinating Membranes". Desalination 3 (1967) 155-168.

Gray et al. "Internal Concentration Polarization in Forward Osmosis: Role of Membrane Orientation". Desalination 197 (2006) pp. 1-8.

Kessler et al. "Drinking Water from Sea Water by Forward Osmosis". Desalination 18 (1976) 297-306.

Khalil et al. "A Novel, Safe, and Environmentally Friendly Technology for Water Production through Recovery of Rejected Thermal Energy from Nuclear Power Plants". Proceedings of ICONE14, International Conference on Nuclear Engineering. Miami, Florida. Jul. 17-20, 2005.

Khaydarov et al. "Solar Powered Direct Osmosis Desalination". Desalination 217 (2007) 225-232.

Loeb et al. "Energy Production at the Dead Sea by Pressure-Retarded Osmosis: Challenge or Chimera". Desalination 120 (1998) pp. 247-262.

Loeb et al. "Large Scale Power Production by Pressure-Retarded Osmosis, Using River Water and Sea Water Passing Through Spiral Modules". Desalination 143 (2002) 115-122.

Loeb et al. "One Hundred and Thirty Benign and Renewable Megawatts From Great Salt Lake? The Possibilities of Hydroelectric Power by Pressure-Retarded Osmosis". Desalination 141 (2001) pp. 85-91.

McCutcheon et al. "A Novel Ammonia-Carbon Dioxide Forward (Direct) Osmosis Desalination Process". Desalination 174:1-11. 2005.

McCutcheon et al. "Desalination by Ammonia-Carbon Dioxide Forward Osmosis: Influence of Draw and Feed Solution Concentrations on Process Performance". Journal of Membrane Science 278 (2006) 114-123.

McCutcheon et al. "The Ammonia-Carbon Dioxide Forward Osmosis Desalination Process". Water Conditioning and Purification; Oct. 2006.

McGinnis et al. "Energy Requirements of Ammonia-Carbon Dioxide Forward Osmosis Desalination". Desalination 207: 370-382. 2007.

McGinnis et al. "Forward Osmosis Desalination: Current Research and Future Prospects". For Presentation at the 2007 Conference of American Membrane Technology Association. Jul. 23-Jul. 27, 2007.

McGinnis et al. "Global Challenges in Energy and Water Supply: The Promise of Engineered Osmosis". Environ. Sci. Technol. 2008, 42, 8625-8629 (Online Dec. 1, 2008).

Mehta et al. "Internal Polarization in the Porous Substructure of a Semipermeable Membrane Under Pressure-Retarded Osmosis". Journal of Membrane Science 4 (1978) pp. 261-265.

Moody et al. "Forward Osmosis Extractors". Desalination 18 (1976) 283-295.

Osman et al. "Desalination/Concentration of Reverse Osmosis and Electrodialysis Brines with Membrane Distillation". Desalination and Water Treatment 24:293-301 (2010).

Panyor et al. "Renewable Energy from Dilution of Salt Water with Fresh Water: Pressure Retarded Osmosis". Desalination 199 (2006) pp. 408-410.

Phuntsho et al. "A Novel Low Energy Fertilizer Driven Forward Osmosis Desalination for Direct Fertigation: Evaluating the Performance of Fertilizer Draw Solutions". Journal of Membrane Science 375 (2011) 172-181.

Ping et al. "Application of Heat Pump Distillation in Gas Separation Device". IEEE ISBN 978-1-61284-278-3; Feb. 19, 2011.

Skilhagen et al. "Osmotic Power—Power Production Based on the Osmotic Pressure Difference Between Waters With Varying Salt Gradients". Desalination 220 (2008) pp. 476-482.

Tang et al. "Concentration of Brine by Forward Osmosis: Performance and Influence of Membrane Structure". Desalination 224 (2008) pp. 143-153.

Timm et al. "Economic and Technical Tradeoffs Between Open and Closed Cycle Vapor Compression Evaporators". 8th Annual Industrial Energy Technology Conference, Houston, TX, Jun. 17, 1986.

Wallace et al. "A Thermodynamic Benchmark for Assessing an Emergency Drinking Water Device based on Forward Osmosis". Desalination 227 (2008) 34-45.

Aly et al. "Mechanical Vapor Compression Desalination Systems—A Case Study". Desalination 158 (2003) pp. 143-150.

Darwish et al. "The Heat Recovery Thermal Vapour-Compression Desalting System: A Comparison with Other Thermal Desalination Processes". Applied Thermal Engineering vol. 16, pp. 523-537. (1996).

Khawaji et al. "Advances in Seawater Desalination Technologies". Desalination 221 (2008) pp. 47-69.

Koonaphapdeelert et al. "Solvent Distillation by Ceramic Hollow Fibre Membrane Contactors". Journal of Membrane Science vol. 314 (2008). pp. 58-66.

Lokiec et al. "The Mechanical Vapor Compression: 38 Years of Experience". IDS World Congress—Maspalomas, Gran Canaria Spain Oct. 21-26, 2007.

Martinetti et al. "High Recovery of Concentrated RO Brines Using Forward Osmosis and Membrane Distillation". Journal of Membrane Science 331 (2009) pp. 31-39.

Elimelech et al. (2005). "Energy requirements of ammonia-carbon dioxide forward osmosis desalination." Desalination, 207, 370-382, Aug. 30, 2006.

\* cited by examiner

FORWARD OSMOSIS SEPARATION PROCESSES

CROSS-REFERENCE TO RELATED APPLICATIONS

This application is the national stage of International (PCT) Patent Application Serial No. PCT/US2010/054512, filed Oct. 28, 2010, which claims the benefit of and priority to U.S. Provisional Patent Application Ser. No. 61/255,734, filed Oct. 28, 2009, the disclosures of which are hereby incorporated herein by reference in their entireties.

FIELD OF THE TECHNOLOGY

One or more aspects relate generally to osmotic separation. More particularly, one or more aspects involve use of engineered osmosis processes, such as forward osmosis, to separate solutes from aqueous solutions.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass but not salts, into the concentrated solution. Gradually, the water entering the concentrated solution dilutes the solution. The solutes are then removed from the dilute solution to generate potable water.

SUMMARY

Aspects relate generally to engineered osmosis systems and methods, including forward osmosis separation, direct osmotic concentration, pressure assisted forward osmosis and pressure retarded osmosis.

In accordance with one or more embodiments, a forward osmosis separation process may comprise introducing a first solution on a first side of a semi-permeable membrane, detecting at least one characteristic of the first solution, selecting a molar ratio for a concentrated draw solution comprising ammonia and carbon dioxide based on the at least one detected characteristic, introducing the concentrated draw solution comprising ammonia and carbon dioxide at the selected molar ratio on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain the selected molar ratio of ammonia to carbon dioxide in the concentrated draw solution, and collecting the solvent stream.

In some embodiments, the separation operation comprises using an absorber configured to condense the draw solutes into the concentrated draw solution. The solvent stream, dilute draw solution or concentrated draw solution may be used as an absorbent in the absorber. Cooling may be used with the absorber. In some embodiments, the process may further comprise compressing a gas stream resulting from separation of the draw solutes from the dilute draw solution using a gas compressor or a steam eductor to promote reabsorption of draw solutes into the concentrated draw solution. The process may further comprise applying pressure on the first solution to enhance or cause flux through the semi-permeable membrane into the concentrated draw solution. The process may further comprise selecting the concentrated draw solution comprising a draw solute characterized by an ability to have its removal from solution or introduction into solution enhanced by use of a catalyst, characterized by an ability to have its removal from solution or introduction into solution enhanced by a reusable physical or chemical agent, or characterized by an ability to have its removal from solution or introduction into solution enhanced by an electric energy field, magnetic energy field or other change of environment such that susceptibility of the draw solute to separation is increased to enhance draw solute removal and reuse.

In some embodiments, the process may further comprise detecting a volumetric change with respect to at least one of the first solution and the concentrated draw solution, and modifying a flow channel relating to the semi-permeable membrane in response to the detected change to maintain a desired flow characteristic. In other embodiments, the process may further comprise enhancing draw solute removal or absorption using a catalyst, reagent, consumable, reusable material, electric energy field or magnetic energy field. In still other embodiments, the process may further comprise reducing process energy by using at least one of mechanical vapor recompression, thermal vapor recompression, vacuum distillation, sweep gas distillation, pervaporation and a closed cycle heat pump. The process may further comprise using carbon dioxide to precipitate the draw solutes and using ammonia to reabsorb precipitate for pressure retarded osmosis. The process may further comprise introducing a seeded slurry to the first solution. In at least one embodiment, the process may further comprise using a supersaturation of salts in the first solution during a first operation and desaturation of salts during a second operation before return to the first operation for resaturation.

In accordance with one or more embodiments, systems and apparatus for osmotic extraction of a solvent from a first solution may comprise a first chamber having an inlet fluidly connected to a source of the first solution, a second chamber having an inlet fluidly connected to a source of a concentrated draw solution comprising ammonia and carbon dioxide in a molar ratio of at least 1 to 1, a semi-permeable membrane system separating the first chamber from the second chamber, a separation system fluidly connected downstream of the second chamber comprising a distillation column, the separation system configured to receive a dilute draw solution from the second chamber and to recover draw solutes and a solvent stream, and a recycle system comprising an absorber configured to facilitate reintroduction of the draw solutes to the second chamber to maintain the molar ratio of ammonia to carbon dioxide in the concentrated draw solution.

In some embodiments, the absorber may comprise a packed column. In at least one embodiment, the absorber comprises a membrane contactor. The membrane contactor may be constructed and arranged to facilitate parallel flow of a cooled absorbent and series flow of draw solute gases in the membrane contactor. In some embodiments, the distillation column may comprise a membrane distillation apparatus. In some embodiments, the recycle system may further comprise a compression operation downstream of the absorber to enhance condensation of draw solute gases. In at least one embodiment, the compression operation comprises a gas compressor, a steam eductor, or a liquid stream eductor. The separation operation may further comprise a carbon sequestration loop to absorb and desorb draw solutes, the carbon sequestration loop configured to complete absorption of draw solute gases and increase their pressure to promote their absorption into the concentrated draw solution.

In some embodiments, the semi-permeable membrane system of the various systems and apparatus disclosed herein may comprise a membrane module immersed in the first solution, and wherein the concentrated draw solution flows through an interior of the membrane module. In at least one embodiment, the semi-permeable membrane system comprises a first flow channel associated with the first solution from which solvent is extracted, the first flow channel having a tapering geometry or a configuration of flow spacers such that an effective volume of the first flow channel decreases along a length of the first flow channel, and a second flow channel associated with the concentrated draw solution into which solvent is extracted from the first solution, the second flow channel having an expanding geometry or a configuration of flow spacers such that an effective volume of the second flow channel increases along a length of the second flow channel. In some embodiments, the semi-permeable membrane system comprises a pyramidal membrane module array to accommodate a decrease in a volume of the first solution and an increase in a volume of the concentrated draw solution, the pyramidal membrane module array configured such that in a counter flow arrangement there are fewer membrane modules in a direction of a draw solution inlet and a feed solution outlet, and more membrane modules in a direction of a feed solution inlet and a draw solution outlet.

In some embodiments, the system may further comprise a downstream zero liquid discharge or other reduced discharge stream operation. The system may further comprise a vacuum or air stripping system configured to assist in stripping draw solutes. The system may further comprise a pervaporation system configured to strip draw solutes. In some embodiments, the pervaporation system may comprise a membrane that is selective for draw solute gases relative to water vapor. The system may further comprise a membrane distillation system to strip draw solutes. In at least some embodiments, membranes may be used for both separation of draw solutes and heat exchange in a module.

In accordance with one or more embodiments, a method for osmotic generation of power may comprise performing a membrane separation operation to form a first solution, precipitating draw solutes from the first solution, separating precipitated draw solutes to form a second solution, promoting production of gases from the second solution, separating the gases with a technique such as kinetic based differential absorption, and using at least one separated gas to redissolve precipitated solutes to form a third solution for reuse in the membrane separation step.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
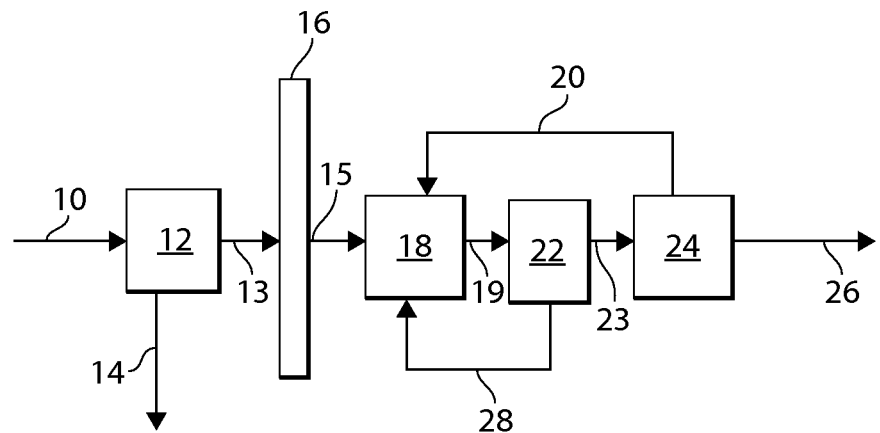
FIG. 1 presents a schematic diagram of a separation method in accordance with one or more embodiments.

In accordance with one or more embodiments, an osmotic method for extracting solvent from solution may generally involve exposing the solution to a first surface of a forward osmosis membrane. In some embodiments, the first solution (known as a process or feed solution) may be seawater, brackish water, wastewater, contaminated water, a process stream or other aqueous solution. In at least one embodiment, the solvent is water, but other embodiments pertain to non-aqueous solvents. A second solution (known as a draw solution), with an increased concentration of solute relative to that of the first solution, may be exposed to a second opposed surface of the forward osmosis membrane. Solvent, for example water, may then be drawn from the first solution through the forward osmosis membrane and into the second solution generating a solvent-enriched solution via forward osmosis. Forward osmosis generally utilizes fluid transfer properties involving movement of solvent from a less concentrated solution to a more concentrated solution. Osmotic pressure generally promotes transport of solvent across a forward osmosis membrane from feed to draw solutions. The solvent-enriched solution, also referred to as a dilute draw solution, may be collected at a first outlet and undergo a further separation process. In some non-limiting embodiments, purified water may be produced as a product from the solvent-enriched solution. A second product stream, i.e., a depleted or concentrated process solution, may be collected at a second outlet for discharge or further treatment. The concentrated process solution may contain one or more target compounds which it may be desirable to concentrate or otherwise isolate for downstream use.

In accordance with one or more embodiments, a forward osmosis separation system may include one or more forward osmosis membranes. The forward osmosis membranes may generally be semi-permeable, for example, allowing the passage of solvent such as water, but excluding dissolved solutes therein, such as sodium chloride, ammonium carbonate, ammonium bicarbonate, ammonium carbamate, other salts, sugars, drugs or other compounds. Many types of semi-permeable membranes are suitable for this purpose provided that they are capable of allowing the passage of water (i.e., the solvent), while blocking the passage of the solutes and not reacting with the solutes in the solution. The membrane can have a variety of configurations including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$.

Preferably, the material selected for use as the semi-permeable membrane should generally be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0 degrees Celsius to about 100 degrees Celsius. In some non-limiting embodiments, process temperatures may range from about 40 degrees Celsius to about 50 degrees Celsius. Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and about 11. In certain non-limiting embodiments, the pH level may be about 7 to about 10. The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

In accordance with one or more embodiments, a forward osmosis separation system may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, methods may achieve a high yield of solvent extraction without excessive energy demands and/or environmentally harmful waste discharge. Solvent may be extracted to concentrate solutes, such as desirable target species, from a process stream in an energy efficient manner that results in high yields. The solvent and/or recovered solutes from the process stream may be desired end products. Solutes in the draw solution may also be recycled within the process.

A separation process in accordance with one or more embodiments may involve exposing a first solution to a first surface of a semi-permeable membrane. A second solution that has a concentration greater than that of the first solution may be exposed to a second opposed surface of this membrane. In some embodiments, the concentration of the second solution may be increased by using a first reagent to adjust the equilibrium of solutes within the second solution to increase the amount of a soluble species of solute within the second solution. The concentration gradient between the first and second solutions then draws the solvent from the first solution through the semi-permeable membrane and into the second solution producing a solvent-enriched solution. In accordance with one or more embodiments, a portion of the solutes may be recovered from the solvent-enriched second solution and recycled to the draw solution. The recovery process may yield a solvent product stream. The concentration gradient also produces a depleted solution on the first side of the semi-permeable membrane which may be discharged or further processed. The depleted solution may include one or more target species of which concentration or recovery is desired.

In accordance with one or more embodiments, an apparatus for the extraction of a solvent from a first solution using osmosis is disclosed. In one non-limiting embodiment of the apparatus, the apparatus has a first chamber with an inlet and an outlet. The inlet of the first chamber may be connected to a source of the first solution. A semi-permeable membrane separates the first chamber from a second chamber. The second chamber has an inlet and first and second outlets. In some embodiments, a third chamber may receive a solvent-enriched second solution from the first outlet of the second chamber and a reagent from the second outlet of the second chamber. The third chamber may include an outlet which is connected to a separation operation, such as a filter for filtering the solvent-enriched second solution. The filter may have a first and second outlet with the first outlet connected to the inlet of the second chamber in order to recycle a precipitated solute to the second chamber. In some embodiments, a fourth chamber may receive the solvent-enriched second solution from the second outlet of the separation operation. The fourth chamber may have a heater for heating the solvent-enriched second solution. A first outlet in the fourth chamber may return constituent gases to the inlet of the second chamber. As discussed herein, various species, such as the gases from the fourth chamber and/or precipitated solute from the third chamber, may be recycled within the system. Such species may be introduced, for example to the second chamber, at the same inlet or at different inlets. A second outlet in the fourth chamber may permit a final product, the solvent, to exit the apparatus. Flow channel configurations may account for changing flow volumes or flow rates in the feed solution and draw solution as flux occurs across the membrane from one solution to the other. The flow channels for the feed and draw solutions in the membrane systems should generally be designed to be approximately equal for short lengths and low to moderate flux rates, or tapering in which feed becomes narrower and draw becomes deeper for longer channel lengths and or higher fluxes.

FIG. 1 shows an overview diagram of a forward osmotic separation system and method in accordance with one or more embodiments, the details of which are further described with reference to FIG. 2. As shown in FIG. 1, a solution (10), for example, seawater, brackish water, wastewater, contaminated water or other solution, referred to as the first solution, is disposed in a first chamber (12). The first chamber (12) is in fluid communication with a semi-permeable membrane (16), as illustrated by arrow (13). A second solution having a concentration greater than the first solution is contained in a second chamber (18). The higher concentration solution enables the solvent, i.e., the water, from the first solution in the first chamber (12) to osmose across the semi-permeable membrane (16) into the more concentrated second solution located within the second chamber (18), as illustrated by arrow (15). Having lost much of its solvent, the remaining first solution in the first chamber (12) is concentrated in solute. The solute may be discarded, as illustrated by arrow (14), if considered a waste product. Alternatively, the solute may be a target compound and may be collected for further processing or downstream use as a desired product.

The resulting solvent-enriched second solution in the second chamber (18) is then introduced, as illustrated by arrow (19), into a third chamber (22). In the third chamber (22), solutes in the solvent-enriched second solution may be separated out and recycled back into the second chamber (18), as illustrated by arrow (28), to maintain the concentration of the second solution. The third chamber (22) and stream (28) are optional in accordance with one or more embodiments. The remaining solvent-enriched second solution in the third chamber (22) may then be introduced, as illustrated by arrow (23), into a fourth chamber (24). In the fourth chamber (24), the remaining solvent-enriched second solution may be heated to remove any remaining solutes to produce a solvent stream, as illustrated by arrow (26). In some embodiments, such as those involving treatment of wastewater, the solvent stream may be purified water. In the fourth chamber (24), heat may remove any remaining solutes by breaking them down into their constituent gases, the gases may be returned to the second chamber (18), as illustrated by arrow (20), to maintain the concentration gradient of the second solution in the second chamber (18) and act as reagent.

In accordance with one or more embodiments, a portion of the dilute draw solution may be used to absorb draw solute gases from a distillation column. In at least one embodiment, both cooling and mixing with an absorbent may occur in an absorption column. The mixing of the gases with a portion of the dilute draw solution acting as an absorbent (to then become the concentrated draw solution) may occur in a vessel. The vessel may generally be sized to provide an area large enough to facilitate interaction between the absorbent and the gases. In some embodiments, a packed column may be used as an absorber. A stripping distillation column and an absorbing column may be used in conjunction in one or more embodiments. Heating may occur in the distillation column while cooling and contact with the dilute draw solution absorbent may occur in the absorbing column. In one preferred embodiment, approximately 25% of the dilute draw solution stream may be directed to an absorber to serve as an absorbent fluid, with the remaining approximately 75% of the dilute stream being directed to the stripper as its feed stream. The balance between these two streams will dictate the concentration of the reconcentrated draw solution returned to the membrane system, as well as the size of the absorber and/or stripper, as well as the quantity of heating required in the stripper and cooling required before, after, and/or within the absorber or stages of the absorber.

Figure 5:
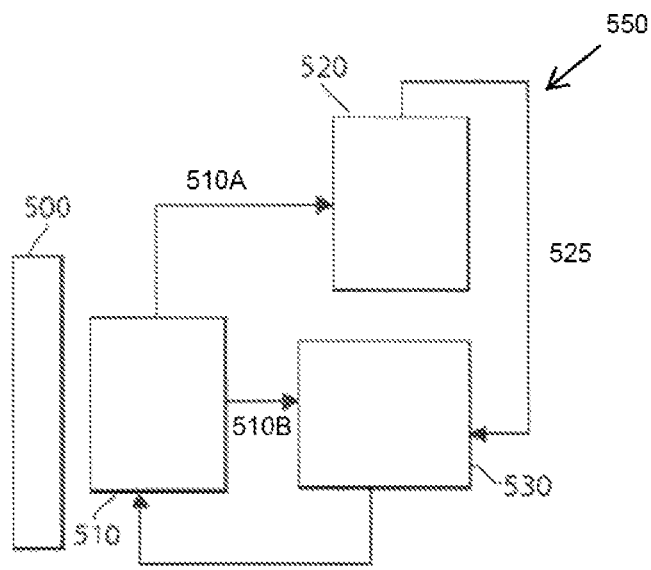
FIG. 5 presents a schematic diagram of a portion of a separation apparatus in accordance with one or more embodiments.

FIG. 5 depicts one example of a draw solute recovery system 550 for use with an osmotic separation process/apparatus described herein. As shown, a first portion 510a of dilute draw solution may be directed from chamber 510 to a distillation column 520 and a second portion 510b of dilute draw solution may be directed from chamber 510 to an absorber module 530. A stream 525 exiting the distillation column 520 may be introduced to the absorber module 530, where it is mixed with dilute draw solution for return back to chamber 510 so as to reintroduce draw solutes to the draw side of a forward osmosis membrane 500.

In accordance with one or more embodiments, draw solutes may be recovered for reuse. Solutes may be stripped from the dilute draw solution to produce product water substantially free of the solutes. Gaseous solutes may then be condensed or absorbed to form a concentrated draw solution. As discussed above, the absorber may use dilute draw solution as an absorbent. In other embodiments, product water may be used as an absorbent, for all or a portion of the absorbing of the gas streams from a solute recycle system.

In accordance with one or more embodiments, it may be desirable to use low temperatures for stripping solutes in view of low temperature heat sources having low cost and few or no alternative uses. The lower the temperature of the stripping, however, the lower its pressure, and lower pressure condensation and absorption has slower kinetics, in some cases making the absorption of certain compounds, such as carbon dioxide, quite difficult. Various methods may be used to absorb remaining gases after solutes have been stripped, and some portion (typically between about 60-80%) of these have been condensed, with the remaining gases having a low tendency to continue to absorb in a short time frame.

In some embodiments, the remaining vapor stream may be compressed to raise its pressure and thereby increase the absorption kinetics. A compressor may be used. In other embodiments, a steam jet may be used in which a small portion of steam may be mixed with vapors to increase pressure to an intermediate pressure between the two streams. In still other embodiments, an absorbing solution may be pressurized and introduced into an eductor jet to entrain and compress the solute vapor.

In one or more embodiments, an absorber with series flow of vapors and series or parallel flow of absorbent may be used in various configurations, using membrane contactors, packing within a column, or similar equipment. In one embodiment, series flow of vapor may be coupled with parallel flow of absorbent which has been cooled, such that no cooling need take place within the absorbing device. In other embodiments, cooling may take place in the device. A heat exchange area as well as a mass interface area may both be in a single device. Absorbent may be used to form a mixture that may be directed to join a concentrated draw solution stream. Absorbents may include dilute draw solution, product water, water with added ammonia, liquid ammonia and non-volatile carbon dioxide sequestrate which would then exit in the product water or be removed or destroyed.

In accordance with one or more embodiments, a carbon dioxide absorbing/desorbing loop may be implemented such that a solution is used as the absorbent at a low pressure to absorb carbon dioxide. The solution may then be pressurized in liquid form, and heated to desorb the carbon dioxide at a higher pressure, allowing the carbon dioxide to be absorbed in a condenser or other manner described above. In this way, some embodiments may resemble a carbon dioxide sequestration system. In some embodiments, the absorbing solution may comprise ammonia in water. In other embodiments, the absorbing solution may comprise a non-volatile solute which may complex with the carbon dioxide and then may be induced to release it, such that the solute is recycled in the absorbing system. In some embodiments, heat may be used. Catalysts and/or reagents may be used in some embodiments. The use of a catalyst or reagent in one or more processes, or in a condenser may increase the kinetics of draw solute condensation or reabsorption.

In accordance with one or more embodiments, dilute draw solution may be directed to a stripper, where low temperature heat causes the draw solutes to evaporate leaving a product water substantially without said solutes. A heat exchanger may be used to condense a portion of the vapors. In at least one embodiment, about 70% of the vapors may be condensed. An absorber system may be used to introduce a portion of the remaining vapors to absorb into a dilute draw solution stream. In at least one embodiment, a second absorber system may use a concentrated ammonia solution to absorb the remaining draw solute vapors. Liquid streams exiting the condenser, and the first and second absorbers, may be mixed and used as all or part of the concentrated draw solution.

As noted above, a separation process in accordance with one or more embodiments may start with the first solution contained within the first chamber (12). The first solution may be an aqueous or non-aqueous solution that is being treated, either for the purpose of purified water recovery, for the removal of undesirable solutes, or for the concentration and recovery of desired solutes. Included among undesirable solutes are undesired chemically precipitable soluble salts such as sodium chloride (NaCl). Typical examples of the first solution include aqueous solutions such as seawater, brine and other saline solutions, brackish water, mineralized water, industrial waste water, and product streams associated with high purity applications, such as those affiliated with the food and pharmaceutical industries. The first solution described herein may be an aqueous solution or a non-aqueous solution. In general, any type of solvent compatible with the draw solution may be used, for example, any solvent capable of dissolving the draw solutes. The first solution may be filtered and pre-treated in accordance with known techniques in order to remove solid and chemical wastes, biological contaminants, and otherwise prevent membrane fouling, prior to osmotic separation and is then supplied to the first chamber (12), as indicated by arrow 10.

In accordance with one or more embodiments, the first solution may be any solution containing solvent and one or more solutes for which separation, purification or other treatment is desired. In some embodiments, the first solution may be non-potable water such as seawater, salt water, brackish water, gray water, and some industrial water. It may be desired to produce purified or potable water from such a stream for downstream use. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver and zinc. In some examples, the first solution may be brine, such as salt water or seawater, wastewater or other contaminated water. In other embodiments, the first solution may be a process stream containing one or more solutes, such as target species, which it is desirable to concentrate, isolate or recover. Such streams may be from an industrial process such as a pharmaceutical or food grade application. Target species may include pharmaceuticals, salts, enzymes, proteins, catalysts, microorganisms, organic compounds, inorganic compounds, chemical precursors, chemical products, colloids, food products or contaminants. The first solution may be delivered to a forward osmosis membrane treatment system from an upstream unit operation such as industrial facility, or any other source such as the ocean.

Like the first solution, the second solution may be an aqueous solution, i.e., the solvent is water. In other embodiments, non-aqueous solutions such as organic solvents may be used for the second solution. The second solution may be a draw solution containing a higher concentration of solute relative to the first solution. The draw solution may generally be capable of generating osmotic pressure within an osmotic separation system. The osmotic pressure may be used for a variety of purposes, including desalination, water treatment, solute concentration, power generation and other applications. A wide variety of draw solutions may be used. In some embodiments, the draw solution may include one or more removable solutes. In at least some embodiments, thermally removable (thermolytic) solutes may be used. For example, the draw solution may comprise a thermolytic salt solution. In some embodiments, an ammonia and carbon dioxide draw solution may be used, such as those disclosed in U.S. Patent Application Publication Number 2005/0145568 to McGinnis, the disclosure of which is hereby incorporated herein by reference in its entirety for all purposes. In one embodiment, the second solution may be a concentrated solution of ammonia and carbon dioxide.

In accordance with one or more embodiments, the ratio of ammonia to carbon dioxide should substantially allow for the full absorption of the draw solution gases into an absorbing fluid, e.g., a portion of the dilute draw solution as described herein, based on the highest concentration of the draw solution in the system. The concentration, volume, and flow rate of the draw solution should generally be matched to the concentration, volume and flow rate of the feed solution, such that the desired difference in osmotic pressure between the two solutions is maintained throughout the membrane system and range of feedwater recovery. This may be calculated in accordance with one or more embodiments taking into consideration both internal and external concentration polarization phenomena in the membrane and at its surface. In one non-limiting desalination embodiment, a concentrated draw solution inlet flow rate may be used which is approximately 33% of the saline feedwater flow rate, typically in the range of about 25% to 75% for a seawater desalination system. A lower salinity feed may require draw solution inlet rates of about 5% to 25% of the feedwater flow. The dilute draw solution outlet rate may typically be about 50% to 100% of the feedwater inlet rate, and about three to four times the volume of the brine discharge.

In accordance with one or more embodiments, the ratio of ammonia to carbon dioxide should generally be matched to the concentrations of the draw solution and the temperatures used in the draw solute removal and recovery process. If the ratios are not sufficiently high, it will not be possible to completely absorb the draw solute gases into salts for reuse in the concentrated solution, and if the ratio is too high, there will be an excess of ammonia in the draw solution which will not properly condense in a desired temperature range, such as that necessary for the use of waste heat to drive the process. For example, in some embodiments a distillation column may strip gases at about 50° C. and an absorbing column may operate at about 20° C. The ratio of ammonia to carbon dioxide should further be considered to prevent the passage of ammonia into the feed solution through the membrane. If the ratio is too high, this may cause unionized ammonia to be present in higher concentrations in the draw solution (normally primarily ammonium) than are necessary or desirable. Other parameters, such as feedwater type, desired osmotic pressure, desired flux, membrane type and draw solution concentration may impact the preferred draw solution molar ratio. The ratio of ammonia to carbon dioxide may be monitored and controlled in an osmotic separation process. In at least one embodiment, the draw solution may comprise ammonia and carbon dioxide in a molar ratio of greater than 1 to 1. In some non-limiting embodiments, the ratio for a draw solution at approximately 50 C, and with the molarity of the draw solution specified as the molarity of the carbon dioxide within that solution, may be at least about 1.1 to 1 for up to 1 molar draw solution, about 1.2 to 1 for up to 1.5 molar draw solution, about 1.3 to 1 for up to 3 molar draw solution, about 1.4 to 1 for up to 4 molar draw solution, about 1.5 to 1 for up to 4.5 molar draw solution, about 1.6 to 1 for up to 5 molar draw solution, about 1.7 to 1 for up to 5.5 molar draw solution, about 1.8 to 1 for up to 7 molar draw solution, about 2.0 to 1 for up to 8 molar draw solution and about 2.2 to 1 for up to 10 molar draw solution. Experiments indicate that these are approximately the minimum ratios needed for stable solubility of solutions of these concentrations at this approximate temperature. At lower temperatures, higher ratios of ammonia to carbon dioxide are required for the same concentrations. At higher temperatures, lower ratios may be required, but some pressurization of the solution may also be required to prevent decomposition of the solutes into gases. Ratios greater than 1 to 1, even at overall concentrations of less than 2 molar greatly increase the stability of the solutions and prevent evolution of carbon dioxide gas and in general thermolytic splitting of the draw solutions in response to even moderate amounts of heat and or reduction of pressure.

The draw solution generally has a concentration of solute greater than that of the feed solution. This may be achieved using solutes that are soluble enough to produce a solution that has a higher concentration than the feed solution. One or more characteristics of the draw solution may be adjusted based on the process stream supplied to the separation system for treatment. For example, the volume, flow rate or concentration of solutes in the feed solution may impact one or more parameters selected for the draw solution. Requirements pertaining to discharge streams associated with the system may also impact one or more operational parameters. Other operational parameters may also be varied based on an intended application of the forward osmosis separation system. Preferably, the solute within the second solution should be easily removable from solution through a separation process, wherein said separation process separates the solute into at least one species that is more readily dissolved in the solvent of the solution, i.e., the soluble species, and one species that is not readily dissolved within the solvent, i.e., the less-soluble species, and the solute should pose no health risk if trace amounts remain in the resulting solvent. The existence of the soluble and less-soluble species of solutes allows for the solutions to be adjusted or manipulated as needed. Typically, the soluble and less-soluble solute species reach a point in solution in which, under the particular condition temperature, pressure, pH, etc., neither species of solute is either increasing or decreasing with respect to the other, i.e., the ratio of the soluble to insoluble species of solute is static. This is referred to as equilibrium. Given the particular conditions of the solution, the species of solute need not be present in a one to one ratio at equilibrium. Through the addition of a chemical, referred to herein as a reagent, the balance between the species of solutes can be shifted. Using a first reagent, the equilibrium of the solution can be shifted to increase the amount of the soluble species of solute. Likewise, using a second reagent, the equilibrium of the solution may be shifted to increase the amount of the less-soluble solute species. After the addition of the reagents, the ratio of species of solutes may stabilize at a new level which is favored by the conditions of the solution. By manipulating the equilibrium in favor of the soluble species of solute, a second solution with a concentration near saturation can be achieved, a state in which the solutions solvent cannot dissolve anymore of the solute.

Preferred solutes for the second (draw) solution may be ammonia and carbon dioxide gases and their products, ammonium carbonate, ammonium bicarbonate, and ammonium carbamate. Ammonia and carbon dioxide, when dissolved in water at a molar ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia so that the molar ratio of ammonia to carbon dioxide is greater than 1 will shift the equilibrium of the solution towards the more soluble species of the solute, ammonium carbamate. The ammonia is more soluble in water and is preferentially adsorbed by the solution. Because ammonium carbamate is more readily adsorbed by the solvent of the second solution, its concentration can be increased to the point where the solvent cannot adsorb anymore of the solute, i.e., saturation. In some non-limiting embodiments, the concentration of solutes within this second solution achieved by this manipulation is greater than about 2 molal, more than about 6 molal, or about 6 molal to about 12 molal.

Ammonia may be a preferred first reagent for ammonium carbamate since it is one of the chemical elements that results when the solute ammonium carbamate is decomposed, otherwise referred to as a constituent element. In general, it is preferred that the reagent for the solvent be a constituent element of the solute since thereby any excess reagent can easily be removed from the solution when the solvent is removed, and, in a preferred embodiment, the constituent element can be recycled as the first reagent. However, other reagents that can manipulate the equilibrium of the solute species in solution are contemplated so long as the reagent is easily removed from the solution and the reagent posses no health risk if trace elements of the reagent remain within the final solvent.

In accordance with one or more embodiments, a draw solution should generally create osmotic pressure and be removable, such as for regeneration and recycle. In some embodiments, a draw solution may be characterized by an ability to undergo a catalyzed phase change in which a draw solute is changed to a gas or solid which can be precipitated from an aqueous solution using a catalyst. In some embodiments, the mechanism may be coupled with some other means, such as heating, cooling, addition of reactant, or introduction of electrical or magnetic field. In other embodiments, a chemical may be introduced to react with a draw solute reversibly or irreversibly to reduce its concentration, change its rejection characteristics by the membrane, or in other ways make it easier to remove. In at least one embodiment, introduction of an electrical filed may cause a change in the draw solute such as a phase change, change in degree of ionization, or other electrically induced changes that make the solute easier to remove. In some embodiments, solute passage and/or rejection may be manipulated, such as by adjusting a pH level, adjusting the ionic nature of a solute, modifying the physical size of a solute or promoting another change which causes the draw solute to readily pass through a membrane which previously it had been rejected. For example, an ionic species may be rendered nonionic, or a large species may be made relatively smaller. In some embodiments, separation techniques not using heating, such as electrodialysis (ED), cooling, vacuum or pressurization may be implemented. In at least one embodiment, an electrical gradient may be implemented in accordance with one or more known separation techniques. In some embodiments, certain separation techniques, such as ED, may be used to reduce species to be separated so as to lower electrical requirements. In at least one embodiment, the solubility of organic species may be manipulated, such as by changing temperature, pressure, pH or other characteristic of the solution. In at least some embodiments, ion exchange separation may be implemented, such as sodium recharge ion exchange techniques, or acid and base recharged ion exchange to recycle draw solutes, including, for example, ammonium salts.

In accordance with one or more embodiments, disclosed draw solutions may be used in any engineered osmosis process, for example, applications involving pressure retarded osmosis, forward osmosis or pressure assisted forward osmosis. In some embodiments, disclosed draw solutions may be used in an osmotic heat engine, such as that described in WIPO Publication No. WO2008/060435 to McGinnis et al., the disclosure of which is hereby incorporated herein by reference in its entirety for all purposes. An osmotic heat engine may convert thermal energy into mechanical work using a semi-permeable membrane to convert osmotic pressure into electrical power. A concentrated ammonia-carbon dioxide draw solution may create high osmotic pressures which generate water flux through a semi-permeable membrane against a hydraulic pressure gradient. Depressurization of the increased draw solution volume in a turbine may produce electrical power. The process may be maintained in steady state operation through the separation of diluted draw solution into a re-concentrated draw solution and deionized water working fluid, both for reuse in the osmotic heat engine. In some embodiments involving use of disclosed draw solutions in an osmotic heat engine, efficiency may be enhanced by precipitating the draw solute. In at least one embodiment, disclosed draw solutions may be used in systems and methods for grid energy storage in which use of salinity gradients involving osmotic pressure gradients or differences between two solutions may be used to produce hydraulic pressure in a concentrated solution, allowing for the generation of power. In accordance with one or more embodiments involving distillation columns such as the multi-stage distillation columns described in WIPO Publication No. WO2007/146094 to McGinnis et al. the disclosure of which is hereby incorporated herein by reference in its entirety for all purposes, dilute draw solution may be used as an absorbing fluid in a heat exchanger or absorber for heat transfer to each stage. In accordance with one or more embodiments, disclosed draw solutions may also be used in various direct osmosis concentration (DOC) applications.

Referring back to FIG. 1, in accordance with one or more embodiments, a separation process may begin by bringing the first solution and the second solution into contact with the first and second sides of the semi-permeable membrane (16), respectively. Although the first and second solutions can remain stagnant, it is preferred that both the first and second solutions are introduced by cross flow, i.e., flows parallel to the surface of the semi-permeable membrane (16). This increases the amount of surface area of the semi-permeable membrane (16) a given amount of the solutions comes into contact with thereby increasing the efficiency of the forward osmosis. Since the second solution in the second chamber (18) has a higher solute concentration than the first solution in the first chamber (12), the solvent in the first solution diffuses to the second solution by forward osmosis. In some embodiments, the difference in concentration between the two solutions is so great that the solvent passes through the semi-permeable membrane (16) without the addition of pressure to the first solution. Overall, this process may result in the removal of about 50% to about 99.9% of the solvent contained within the first solution. During the separation process, the first solution becomes more concentrated as it loses solvent and the second solution becomes more diluted as it gains solvent. Despite this occurrence, the concentration gradient between the two solutions remains significant. The depleted solution on the first side of the membrane, and the diluted solution on the second side of the membrane may each be further processed for the recovery of one or more desired products. For example, the depleted solution on the first side of the membrane may contain solutes which are target species whose concentration and recovery is desired. Alternatively, the depleted solution on the first side of the membrane may be discarded as waste. Likewise, the diluted solution on the second side of the membrane may be rich in solvent which may be a desired product.

The discharge (14), i.e, the concentrated first solution has a greater concentration of solutes. Thus, the excess solutes can be removed from the concentrated first solution prior to returning the first solution to its source or recirculating the first solution through the present method. This can be done, for example in some non-limiting embodiments, by contacting the concentrated first solution with a solar evaporator, a mechanism of simple screen filtration, hydrocyclone, or a precipitation mass or other nucleation point, to precipitate the solute. This precipitated solute may be further processed to make it suitable for consumer or industrial purposes.

Having extracted the solvent of the first solution into the second solution by forward osmosis, thereby forming a solvent-enriched second solution, it may then be desirable to remove the solutes from the solvent-enriched second solution to isolate the solvent. In some non-limiting embodiments, this can be accomplished by precipitating the solutes out of the solution, decomposing the solutes into their constituent gases that vaporize out of solution, distilling the solvent out of the solution or absorption of the solutes onto a surface. In at least one embodiment, removing a portion of the solutes by precipitation decreases the amount of energy required to heat the solution to decompose the remaining solutes, and decomposition results in the complete removal of the solutes. Potential precipitation and decomposition steps are described with reference to the third and fourth chamber (22, 24), respectively.

The solvent-enriched second solution in the second chamber (18) may be withdrawn to a third chamber (22), as shown by arrow (19). The solvent-enriched second solution may then be treated to remove a portion of the solutes from the solvent-enriched solution by precipitation. A second reagent may be introduced to adjust the equilibrium of the soluble and less-soluble solute species in favor of the less-soluble solute species. As with the first reagent, any chemical capable of adjusting the equilibrium is suitable so long as it is easily removed from the solvent-enriched second solution and posses no health risk. Preferably the reagent is a constituent element of the solute, and in the case of the preferred solute ammonium carbamate is carbon dioxide gas. In some non-limiting embodiments, when the solvent-enriched second solution is diffused with carbon dioxide, the ratio of ammonia to carbon dioxide in solution may be reduced to around between 1 and 1.5 and the equilibrium in the solvent-enriched second solution shifts back towards the less-soluble species of solute, ammonium bicarbonate. The less-soluble species of solute may then precipitate out of solution. The precipitation of the ammonium bicarbonate may result in a substantial reduction in the concentration of solutes within the solvent-enriched second solution to about 2 to 3 molar. Preferably, the temperature of the solvent-enriched second solution in the third chamber (22) is lowered to about 18 to 25° C., preferably 20 to 25° C. to assist in the precipitation of the solute. The precipitated solute may then be filtered from the solution.

Figure 2:
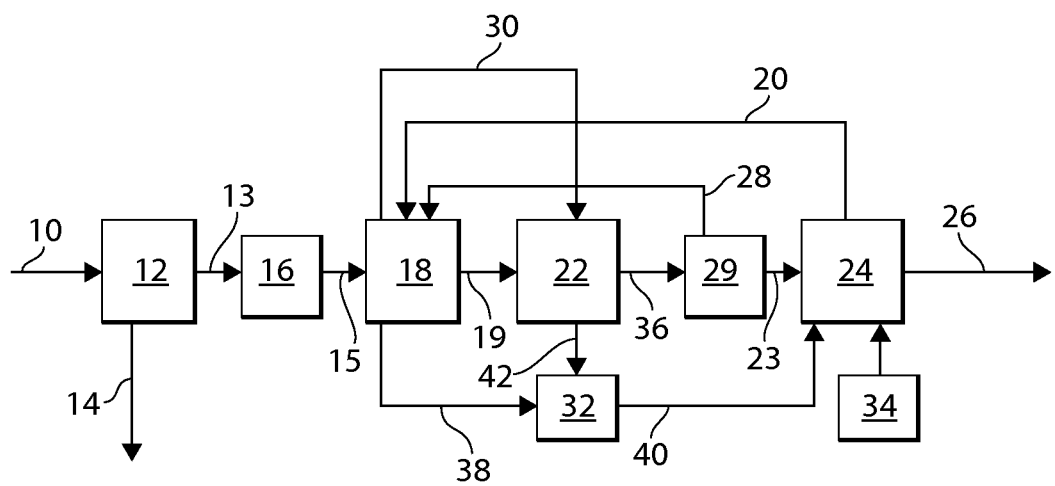
FIG. 2 presents a detailed schematic diagram of a separation method in accordance with one or more embodiments.

Referring now to FIG. 2, although the precipitated solute may be filtered within the third chamber (22), the solution may be directed to a filtration chamber (29) as shown by arrow (36). Using well known methods, such as a hydrocyclone, a sedimentation tank, column filtration, or a simple screen filtration, the precipitated solute may be removed from the solvent-enriched solution. For example, the precipitate may be allowed to settle out of solution by gravity at which time the remaining solution may then be siphoned off. The remaining solvent-enriched second solution may be transferred from the filter chamber (29) to a fourth chamber (24), as shown by arrow (23), where it is then heated to decompose the solutes into their constituent gases. In one preferred embodiment, these constituent gases may be ammonia and carbon dioxide. The energy required for the separation process is the heat required to raise the temperature of the solution to a temperature which results in the complete removal of the ammonium carbamate solute. Additional heat is also required to make up for the inefficiency of heat transfer of the enthalpies of vaporization and solution of the solutes recycled within the process. Specifically, heating causes the remaining solutes in the solvent-enriched second solution to decompose into their constituent gases, which leave the solution. In some embodiments, a vacuum or air flow may be maintained over the solvent-enriched second solution while it is being heated in order to improve the efficiency and or lower the temperature at which the decomposition gases vaporize out of solution. By generating the air flow over the fourth chamber it may be possible to remove all the solutes at a lower temperature than typically used. This decomposition may result in a solvent product, such as a potable water product, which may be further treated for end use. In general, a potable water product should have a pH of about 7, and further pH adjustments and or additions of desirable constituents such as salts and or residual disinfectants may be necessary to make the water suitable for its intended purpose.

The solvent-enriched second solution may be heated using a combination of external heat sources (34) and heat pumped through a heat exchanger (32) from the exothermic introduction of gases and solutes (38, 42). The external heat source (34) may be supplied by any thermal source including solar and geothermal energy. The sources may be similar to those of distillation. In some embodiments, the sources may be primarily from cogeneration environments, making use of waste heat from power generation or industrial processes. Furthermore, the process efficiency may be maintained by using a heat exchanger (32) to capture the heat released during the previous steps in the present method of desalination. As shown by the arrows (38) and (42) in FIG. 2, heat released from the chemical reactions within the second and third chambers (18, 22) may be pumped to the heat exchanger (32) that then pumps this heat to the fourth chamber (24) to assist in heating the solvent-enriched second solution, as shown by arrow (40). In an alternative embodiment, additional heat is generated by allowing the constituent gases released to condense on the exterior of the chamber (24) in which the solvent-enriched second solution is being heated, thus, transferring the energy from this exothermic reaction to the fourth chamber (24). The condensate, which in one preferred embodiment is ammonium carbamate, may then be recycled to the second solution in the second chamber (18).

It is also preferable to recycle the solutes and solute constituents removed from the second solution to limit the environmental impact and cost of the present method of forward osmosis separation. The precipitated solute discarded from a filtration chamber may be recycled to the second chamber (18) where it can dissolve in the second solution and thereby maintain the high concentration of the second solution, as shown by arrow (28). Additionally, the constituent gases removed from the solvent-enriched second solution in the fourth chamber (24) can be recycled back to the second or third chambers (18, 22) as shown by arrows (20) and (30), respectively, where they act as reagents. In one preferred embodiment, the solute is ammonium carbamate, which is decomposed into its constituent gases: ammonia and carbon dioxide. These gases are then recycled to the second chamber (18), as shown by arrow (20). Since the ammonia is more soluble than the carbon dioxide, the ammonia is preferentially adsorbed by the second solution and acts as a reagent by adjusting the equilibrium of the solute species in favor of ammonia carbamate. The remaining carbon dioxide is withdrawn from the second chamber (18), as shown in arrow (30), and transferred to the third chamber (22) where it acts as a reagent and alters the equilibrium of the second solution in favor ammonium bicarbonate. Since some preferred embodiments contemplate recycling the constituent gases derived from the decomposition of the solutes, it may be necessary to precipitate less than optimal amounts of the solutes to ensure that enough gas is recycled to maintain the efficiency of the present process. Typically, removing about half of the solutes from solution by precipitation should assure that sufficient amounts of the constituent gases will be generated to maintain the present process.

The process described herein may be conducted continuously, or in batches, to better isolate the solutes from solvent throughout the process.

Figure 3:
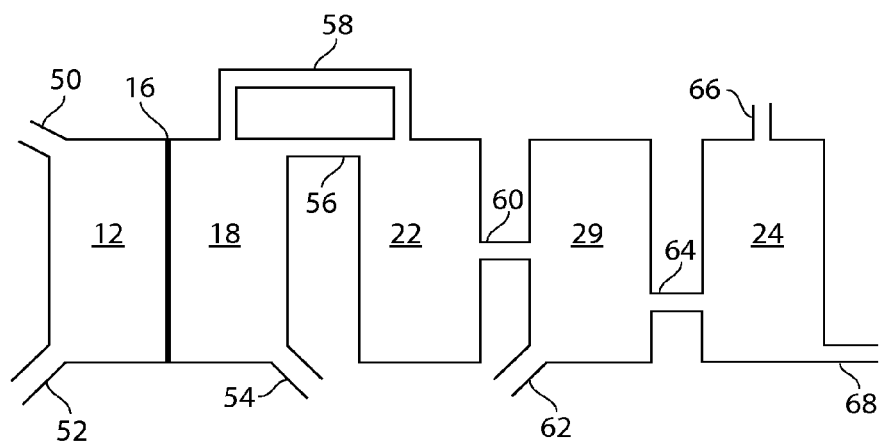
FIG. 3 presents a diagram of an apparatus used in a separation method in accordance with one or more embodiments.

One non-limiting embodiment of an apparatus for conducting the present method is detailed in FIG. 3. The apparatus has a first chamber (12) that has an inlet (50) and an outlet (52). The inlet (50) for the first chamber (12) is in communication with a source for the first solution, such as a holding tank for solution having undergone pre-treatment or being introduced from an upstream operation, or to a natural source for the first solution, such as a sea, a lake, stream or other bodies of water and waterways. The inlet (50) for the first chamber (12) may incorporate a pump in order to siphon the first solution from its source and or a screen or filter to remove particulates. It also may optionally include heating or cooling devices in order to adjust the temperature of the first solution. Similarly, the outlet (52) for the first chamber (12) may incorporate a pump in order to extract the first solution from the first chamber (12). The outlet (52) may be used to recirculate the first solution directly to the source for the first solution, although preferably, the first solution will be pumped into or across a precipitation device prior to being returned to the source of the first solution. Such a precipitation device may include a solar evaporation bed, a mechanism of simple screen filtration, a hydrocyclone, or a precipitation mass or other nucleation point operation or other types known to those skilled in the art. The first chamber (12) is separated from a second chamber (18) by a semi-permeable membrane (16).

The second chamber (18) has an inlet (54) and first and second outlets (56, 58). The inlet (54) provides a source for the second solution and may incorporate a pump as well as heating device. The first outlet (56) for the second chamber (18) is in communication with a third chamber (22) and provides a conduit for transferring the solvent-enriched second solution to the third chamber (22). This first outlet (56) for the second chamber (18) can incorporate a pump to withdraw the water-enriched second solution from the second chamber (18). In another embodiment of the present invention, the first outlet (56) for the second chamber (18) may incorporate a cooling device to cool the solvent-enriched second solution as discussed above. The second outlet (58) for the second chamber (18) provides a conduit for any gas remaining when gases from a fourth chamber (24) are introduced into the second solution through inlet (54), which in the preferred embodiment would be primarily carbon dioxide gas, as ammonia is expected to preferentially absorb into this solution, to be transferred to the third chamber (22).

In some embodiments, the third chamber (22) is where a portion of the solute is precipitated out of the solvent-enriched second solution. The third chamber (22), in addition to inlets for connecting to outlets (56) and (58), has an outlet (60) in communication with a filtration device (29) for separating the precipitate from the solvent-enriched second solution. The filtration device (29) is of any of the types disclosed above, although it preferably is a sedimentation tank. The filtration device (29) has two outlets. The first outlet (62) may be used to dispose of the precipitated solute or return it to the second chamber (18) through the second chamber inlet (54), and the second outlet (64) may be used to transfer the remaining solvent-enriched second solution to the fourth chamber (24). In an alternate embodiment, the filtration device (29) may be incorporated into the third chamber (22), in which case the third chamber (22) will have an additional outlet, one outlet to transfer the remaining solvent-enriched second solution to the fourth chamber (24) and another outlet to dispose of the precipitated solute or, in the preferred embodiment, return the precipitated solute to the second chamber (18) through the second chamber inlet (54).

The fourth chamber (24) may incorporate a heating device for heating the remaining solvent-enriched second solution. The fourth chamber (24) also incorporates a first outlet (66), which may incorporate a vacuum, fan, or other device for generating airflow, for venting the constituent gases. Preferably, the first outlet (66) for the fourth chamber (24) is in communication with the inlet (54) for the second chamber (18) to recycle the constituent gases as the second solute. The second outlet (68) acts as a conduit for withdrawing the final solvent product, such as potable or purified water.

Any materials may be used to construct the various holding and/or storage devices (chamber, vessels and receptacles), conduits, piping, and related equipment, as long as they will withstand the weight of the solutions, and be unreactive with any solutes within the solutions. Typical materials are non-corrosive, non-reactive materials such as stainless steel, plastic, polyvinyl chloride (PVC), fiberglass, and so forth. The vessels can take any suitable configuration, but are typically cylindrical tanks, contoured or fitted tanks, and so forth. The receptacles are typically water towers, cylindrical tanks, contoured or fitted tanks, and so forth. As discussed above, it is important to note that the chambers are shown as separate units but the invention is not limited to that configuration, and where appropriate, any number of chambers can be contained within a single vessel, for example, partitioned into two chambers separated by the semi-permeable membrane (16).

The heating and cooling devices can be electrical heaters, refrigeration units, solar collectors, and heat exchangers such as steam condensers, circulators and so forth, such as are well known in the art, but preferably heat exchangers. The heating and cooling devices, along with any other equipment used within the process, that may have power requirements, can derive their energy from any variety of commonly used sources, including by means of illustration and not limitation, waste steam, solar energy, wind or geothermal energy, and conventional sources.

Figure 4:
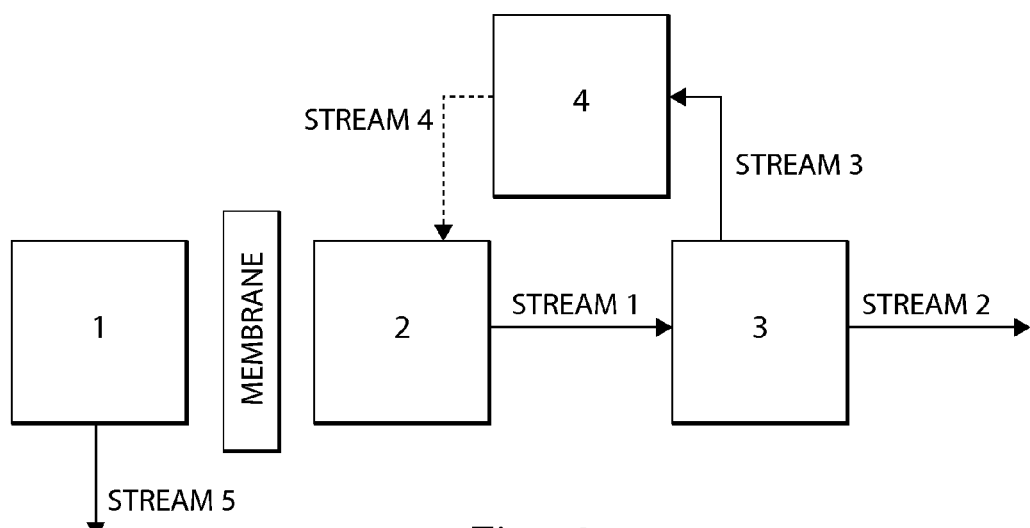
FIG. 4 presents a schematic diagram of an apparatus used in a separation method in accordance with one or more embodiments.

With reference to FIG. 4, a concentration process in accordance with one or more embodiments is disclosed. A first solution (1) is exposed to one side of a forward osmosis membrane. In embodiments where the first solution comprises a waste stream to be treated, the first solution is typically aqueous and contains a solution of species such as salts, proteins, catalysts, microorganisms, organic or inorganic chemicals, chemical precursors or products, colloids, or other constituents. In embodiments where the first solution contains desired target species to be concentrated and recovered, the first solution may comprise a pharmaceutical, salt, enzyme, protein, catalyst, microorganism, organic compound, inorganic compound, chemical precursor, chemical product, colloid, food product or contaminant. The exposure of the first solution to one side of the membrane may be achieved in many configurations, two of which are immersion of the membrane in the solution or direction of the solution past the membrane. This solution may be introduced continuously, in batch, once or many times, to a vessel or direction means. This input stream of the first solution (1) is not shown in the schematic.

A second solution (2), for example comprised of species including water, ammonia, and carbon dioxide, capable of generating an osmotic pressure which is higher than that of the first solution, is exposed to the side of the membrane opposite that exposed to the first solution. This exposure may be achieved by many techniques, but may include immersion of the membrane in the second solution (though not if immersion is used for the first solution) or the direction of the second solution past the membrane surface. The membrane, being impermeable to all or some of the species of the first solution, such as salts, charged and/or large molecules, microorganisms, and particulate matter, but allowing the passage of the solvent, such as water, allows the difference in osmotic pressure between the first and second solutions to induce a flux of water through the membrane from the first to the second solution. This flux may be allowed to significantly, partly, or largely dilute the second solution and/or concentrate the first solution. Some, none, few, or one of the select or target species of the first solution may also be expected to pass through the membrane, depending on the membrane type and/or the intention of the process use.

A portion of the solvent-enriched second solution is directed (via stream 1) to a draw solute separation operation (3), such as a distillation column, membrane distillation operation, or pervaporation operation, which causes the solutes in the solvent-enriched second solution, for example ammonia and carbon dioxide solutes, including species of ammonium salts, to be removed, by adding heat to the draw solute separation operation (3) and/or applying a pressure difference to the gases above and/or produced by the draw solute separation operation. In accordance with one or more embodiments, a membrane separation method, such as pervaporation, may allow for the separation of the draw solution gases from the dilute draw solution with significant restrictions on the flow of water vapor, which may increase the efficiency of the separation process. Pervaporation materials may include natural or synthetic polymers such as polyurethane or natural rubber, or suspended liquid membranes which act as passive or active selective membranes for ammonia and carbon dioxide relative to water vapor. In some embodiments, a pervaporation or similar membrane separation method may be used in place of or in conjunction with a distillation column. In at least one embodiment, an absorber column may also be implemented. In another embodiment, the gases of stream 3 are compressed to raise the temperature at which they may be reabsorbed into the draw solution completely or near completely. In accordance with one or more embodiments, an absorber may be used with cooling prior to or during reabsorption of draw solutes. In at least some embodiments, a portion of the dilute draw stream may be diverted to the absorber as an absorbent flow.

The draw solute separation operation (3) produces a solvent stream, designated stream 2, which is reduced in concentration of the species of stream 1, either partially, substantially, or completely, and a gas stream, designated stream 3, containing the removed species from stream 1. Stream 3 is directed to an operation (4) designated to reconstitute the second solution which will be used to augment, replace, or maintain the characteristics of the second solution, such as volume or concentration. This operation (4) may include dissolving the species in water, a portion of the second solution, precipitation and mixing with the second solution or some other method, such that the species removed in operation (3) are reintroduced to the second solution. This reintroduction is shown as the dashed stream 4. Rejected components of solution 1 may be removed from solution 1, periodically or continuously, as water is removed from this solution. This operation may include settling, hydrocyclone separation, precipitation, force gradient (such as electrical or magnetic), blowdown or other unit operation. This stream of components removed from 1 is shown as stream 5. In some embodiments, stream 5 may be a desired product stream or may be discarded as waste. By these techniques, osmotic pressure is used to remove solvent from a solution by osmotically driven flux through a semi-permeable membrane, for example separating solvent from a pharmaceutical compound, food product, or other desired species in solution, or treating a process stream by the removal of undesired solutes to produce a purified product stream. Stream 5 may additionally be treated to remove any of the draw solutes from vessel 2 that have migrated through the membrane into vessel 1. This treatment may include distillation, air stripping, pervaporation, breakpoint chlorination, ion exchange or other means. The draw solutes removed from stream 5 may be reintroduced to vessel 2 through mixing with stream 4 or by other means.

In accordance with one or more embodiments, techniques for reducing the delta T required in the solute recovery and recycling system may be implemented. For example, the draw solution gases may be compressed to allow them to form the concentrated solution at a lower delta T. The desired delta T for any system might also be achieved by integrating either mechanical or absorption heat pumps.

Figure 6:
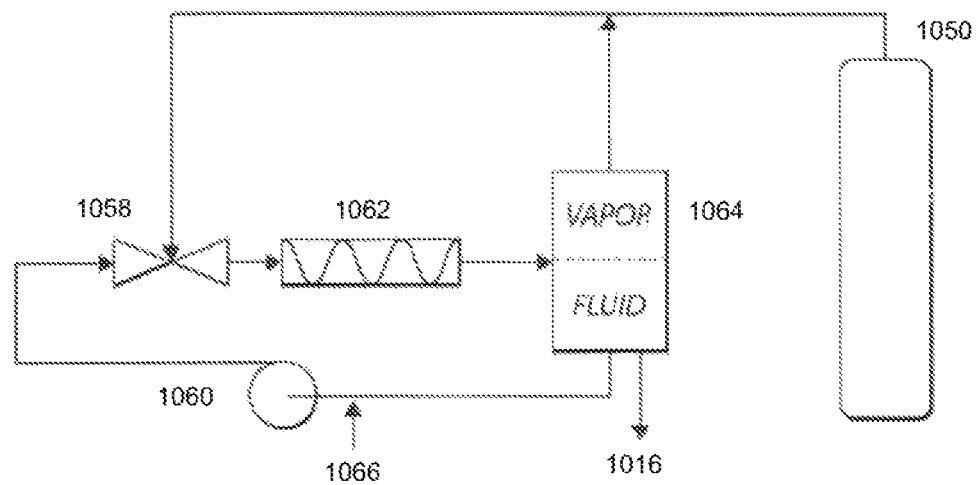
FIG. 6 presents a schematic diagram of a portion of a separation apparatus in accordance with one or more embodiments.

In accordance with one or more embodiments, for example as illustrated in FIG. 6, vacuum distillation and/or gas absorption may be integrated for engineered osmosis applications such as those involving forward osmosis. As shown in FIG. 6, an eductor 1058 driven by a high pressure water solution (as may be assisted by a pump 1060) may be used to draw a vacuum on a distillation column 1050. The gas-water mixture exiting the eductor 1058 may flow through a static mixer 1062 to assure that the gases dissolve in the water. The water solution may then flow to a gas-liquid separator 1064, where the gas can be captured and recycled and a portion of the solution 1016 is recycled to drive the eductor 1058. Additionally, a portion of the solution 1016 can form a reconstituted draw solution that is recycled to an osmotically driven membrane system as described herein.

In accordance with one or more embodiments, draw solutes may be recycled and draw solutions may be regenerated in various ways. In some embodiments, draw solutes may be recycled without using a distillation column. In other embodiments, membrane distillation using a porous membrane may be implemented. In still other embodiments, pervaporation techniques involving a selective membrane which allows draw solutes to pass but not water vapor, or vice versa, may be used. In some embodiments, filtration fibers for draw solutes may be integrated with heat exchange fibers. Some fibers may be impermeable but allow heating or cooling of the draw solution through heat transfer at the fiber wall, while other fibers may be selective and used to separate and recycle draw solute. The percentage of each type may be varied, the longitudinal or vertical orientation of various fibers may vary, and in some embodiments the fibers may be staged in zones. Such arrangements may facilitate reduction of energy requirements in applications such as those involving an osmotic heat engine. In some embodiments, such as those involving relatively small scale applications, a collapsible mobile configuration with integrated mechanics may be implemented.

In accordance with one or more embodiments, an apparatus for osmotic extraction of a solvent from a first solution may comprise a membrane separation system comprising a first flow channel associated with the first solution from which solvent is extracted, the first flow channel having a tapering geometry or a configuration of flow spacers such that an effective volume of the first flow channel decreases along a length of the first flow channel, and a second flow channel associated with a draw solution into which solvent is extracted from the first solution, the second flow channel having an expanding geometry or a configuration of flow spacers such that an effective volume of the second flow channel increases along a length of the second flow channel.

In accordance with one or more embodiments, an apparatus for osmotic extraction of a solvent from a feed solution may comprise a membrane system comprising a pyramidal membrane module array to accommodate a decrease in a volume of the feed solution and an increase in a volume of a draw solution, the pyramidal membrane module array configured such that in a counter flow arrangement there are fewer membrane modules in a direction of a draw solution inlet and a feed solution outlet, and more membrane modules in a direction of a feed solution inlet and a draw solution outlet.

In accordance with one or more embodiments, an apparatus for osmotic extraction of a solvent may comprise a draw solute characterized by an ability to have its removal from solution or introduction into solution enhanced by use of a catalyst.

In accordance with one or more embodiments, an apparatus for osmotic extraction of a solvent may comprise a draw solute characterized by an ability to have its removal from solution or introduction into solution enhanced by a reusable physical or chemical agent.

In accordance with one or more embodiments, an apparatus for osmotic extraction of a solvent may comprise a draw solute characterized by an ability to have its removal from solution or introduction into solution enhanced by an electric energy field, magnetic energy field or other change of environment such that susceptibility of the draw solute to separation is increased to enhance draw solute removal and reuse.

In accordance with one or more embodiments, a method for osmotic generation of power may comprise performing a membrane separation operation to form a first solution, precipitating draw solutes from the first solution, separating precipitated draw solutes to form a second solution, promoting production of gases from the second solution, separating the gases with a technique such as kinetic based differential absorption and using at least one separated gas to redissolve precipitated solutes to form a third solution for reuse in the membrane separation step.

In accordance with one or more embodiments, an osmotic separation system may comprise an apparatus configured to extract a solvent from a first solution to create a concentrated solution and a downstream zero liquid discharge or other reduced discharge stream process having an inlet configured to receive the concentrated solution.

In accordance with one or more embodiments, an osmotic extraction process may comprise extracting a solvent from a first solution to create a concentrated solution via osmotic separation, recovering one or more solutes from the concentrated solution, and delivering the one or more recovered solutes to a downstream operation.

In accordance with one or more embodiments, an apparatus for the extraction of a solvent from a first solution may comprise a vacuum or air scour system configured to assist in stripping solutes in a second solution, to allow for their reuse and production of a product stream or working fluid greatly reduced in concentration of the solutes, and a pervaporation system comprising a membrane that is selective for the solutes relative to water vapor or other constituents of the second solution.

In accordance with one or more embodiments, an apparatus for the extraction of a solvent from a first solution may comprise a pervaporation operation configured to assist in stripping solutes in a second solution, to allow for their reuse and production of a product stream or working fluid greatly reduced in concentration of the solutes.

In some embodiments, hollow fiber membranes are used for separation in a module that also contains hollow fibers used for heat exchange.

In accordance with one or more embodiments, an apparatus for the extraction of a solvent from a first solution may comprise a membrane distillation system to assist in stripping solutes in a second solution, to allow for their reuse and production of a product stream or working fluid greatly reduced in concentration of the solutes.

In accordance with one or more embodiments, an apparatus for the extraction of a solvent from a first solution may comprise a membrane system comprising a membrane module immersed in a first solution, and a second solution flowing through an interior of the membrane module.

In accordance with one or more embodiments, an osmotic method for extraction of a solvent from a first solution may comprise compressing a gas stream resulting from separation of solutes from a second solution using a gas compressor or an eductor driven by hydraulic pressure on an absorbing liquid stream so that the solutes may be more readily absorbed into a regenerated concentrated second solution.

In accordance with one or more embodiments, an osmotic method for extraction of a solvent from a first solution may comprise applying pressure on the first solution to enhance or cause flux of the solvent through a membrane into a second solution.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of any appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in any claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A forward osmosis separation process, comprising:
    introducing a first solution on a first side of a semi-permeable membrane;
    detecting at least one characteristic of the first solution;
    selecting a molar ratio for a concentrated draw solution based on the at least one detected characteristic;
    introducing the concentrated draw solution at the selected molar ratio on a second side of the semi-permeable membrane to maintain a desired osmotic concentration gradient across the semi-permeable membrane;
    promoting flow of at least a portion of the first solution across the semi-permeable membrane to form a second solution on the first side of the semi-permeable membrane and a dilute draw solution on the second side of the semi-permeable membrane;
    introducing a first portion of the dilute draw solution to a separation operation to recover draw solutes and a solvent stream, wherein the introducing step comprises introducing the first portion of the dilute draw solution to a distillation apparatus to vaporize the draw solutes out of the dilute draw solution;
    introducing the vaporized draw solutes to a heat exchanger to at least partially condense the vaporized draw solutes;
    introducing the at least partially condensed draw solutes to an absorber;
    introducing a second portion of the dilute draw solution to at least one of the heat exchanger or the absorber;
    recycling the condensed draw solutes to the second side of the semi-permeable membrane to maintain the selected molar ratio of the concentrated draw solution; and
    collecting the solvent stream.

2. The process of claim 1, further comprising use of cooling with the absorber.

3. The process of claim 1, further comprising compressing a gas stream resulting from separation of the draw solutes from the dilute draw solution using a gas compressor or a steam eductor to promote reabsorption of draw solutes into the concentrated draw solution.

4. The process of claim 1, further comprising applying pressure on the first solution to enhance or cause flux through the semi-permeable membrane into the concentrated draw solution.

5. The process of claim 1, further comprising selecting the concentrated draw solution comprising a draw solute characterized by an ability to have its removal from solution or introduction into solution enhanced by use of a catalyst, a reusable physical or chemical agent, an electric energy field, a magnetic energy field, or other change of environment such that susceptibility of the draw solute to separation is increased to enhance draw solute removal and reuse.

6. The process of claim 1, further comprising enhancing draw solute removal or absorption using a catalyst, reagent, consumable, reusable material, electric energy field or magnetic energy field.

7. The process of claim 1, further comprising reducing process energy by incorporating at least one of mechanical vapor recompression, thermal vapor recompression, vacuum distillation, sweep gas distillation, pervaporation or a closed cycle heat pump into the separation operation.

8. The process of claim 1, further comprising introducing a seeded slurry to the first solution.

* * * * *